United States Patent Office.

WILLIAM A. TORREY, OF MONT CLAIR, NEW JERSEY.

Letters Patent, No. 110,172, dated December 13, 1870.

IMPROVEMENT IN INDIA-RUBBER AND COMBINATION HOSE.

The Schedule referred to in these Letters Patent and making part of the same.

*To all whom it may concern:*

Be it known that I, WILLIAM A. TORREY, of Mont Clair, Essex county, and State of New Jersey, have made a new and useful Improvement in Vulcanized-Rubber Hose; and I hereby declare the following to be a full and exact description of the same.

It has long been known that rubber hose deteriorates near the ends before it does at the other portions.

In hose, as I have heretofore manufactured it, this defect has been remedied, to some extent, by placing one or more additional plies of canvas, or other strengthening and reinforcing material, at the end portions of the hose.

I find that the injury to the ends of the hose is, in part at least, occasioned by the expansion and contraction of the hose, especially at the end where it is joined to the coupling. This is caused by the mode of making the hose of cloth or canvas cut bias, that is, having the threads, warp, and woof running in a spiral direction around the length of the hose. This expansion and contraction at the end where the coupling is joined have a tendency to break and separate the plies of cloth, and thus let in water and finally destroy the hose.

My invention consists in reinforcing the ends of hose by an extra ply of cloth, canvas, duck, or other fabric or material, having the threads run so as to form a right angle with the axis of the hose. This will make the end of the hose as rigid and non-expansible as the shank of the coupling itself. It should be made of very strong material, so that it will stand the entire pressure within the hose at the part where the coupling is joined.

This reinforcing may be made by an extra ply on the end of the hose, or by winding, plaiting, or braiding cords, threads, or other stong material around and near that portion of the hose to which the coupling is joined. This will greatly add to the strength and durability of the hose, and, since it will prevent any sudden expansion of the hose when under pressure, no breaking or loosening of the hose will take place at its connection with the coupling.

Having thus described my invention,

What I claim, and desire to secure by Letters Patent of the United States, is—

1. The improved mode herein described for strengthening and reinforcing the ends of hose, by applying thereto any suitable fabric or material in the manner set forth.

2. The combination, with vulcanized hose, of a reinforcing or strengthening fabric or material, having its threads or strands at right angles to the axis of the hose, so as to prevent expansion, as set forth.

3. The improved hose herein described, having its ends reinforced and strengthened in the manner described.

WILLIAM A. TORREY.

Witnesses:
JNO. D. PATTEN,
D. P. COWL.